Jan. 23, 1962  G. E. EUWE ET AL  3,018,146
BEARING
Filed Nov. 28, 1958

INVENTORS
Garrit Evert Euwe
Cornelis Johannes Adrianus Cieremans
ATTY'S

3,018,146
BEARING

Gerrit Evert Euwe, Vlaardingen, and Cornelis Johannes Adrianus Cieremans, Rotterdam, Netherlands, assignors to Lever Brothers Company, New York, N.Y., a corporation of Maine
Filed Nov. 28, 1958, Ser. No. 776,935
Claims priority, application Great Britain Dec. 6, 1957
5 Claims. (Cl. 308—238)

This invention relates to bearings, and in particular to bearings made from plastics materials.

Nylon has been used as bearing material because nylon bearings are light and can be manufactured economically. Moreover, they are corrosion resistant and are able to run dry, i.e. they are self lubricating, so that no dust or other contaminant is collected. However, nylon bearings absorb moisture causing expansion of the material. This expansion can cause the bearings to seize up.

It is an object of the present invention to provide a bearing of plastics material having a high coefficient of moisture absorption in which the tendency to seize up due to expansion of the bearing material is reduced.

The present invention provides a bearing of plastics material having a high coefficient of moisture absorption comprising two coaxial cylindrical sleeves and a connecting member which connects the sleeves and is integral with the sleeves arranged in the annular space between the sleeves, the connecting member being inclined at an angle to the axis.

The connecting member has preferably the shape of a hollow truncated cone. In that case, references to the connecting member being inclined at an angle to the axis are to indicate that the wall of the hollow truncated cone is inclined at an angle to the axis.

The connecting member preferably connects one end of the inner sleeve with the opposite end of the outer sleeve.

The invention is particularly applicable to bearings made of nylon or polyurethane. If desired, additives such as graphite, polytetrafluoroethylene or molybdenum-disulphide can be incorporated to lower the coefficient of friction of the material.

Figures 1, 2:
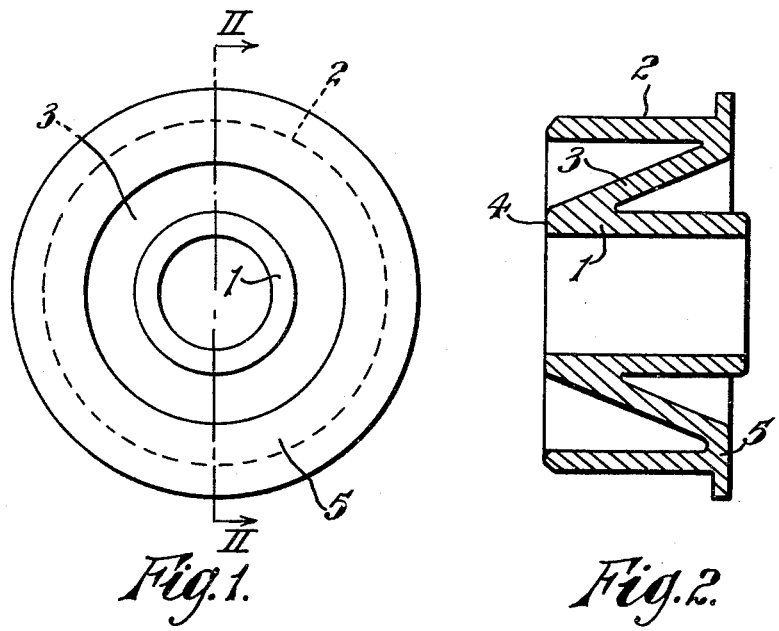
Figure 3:
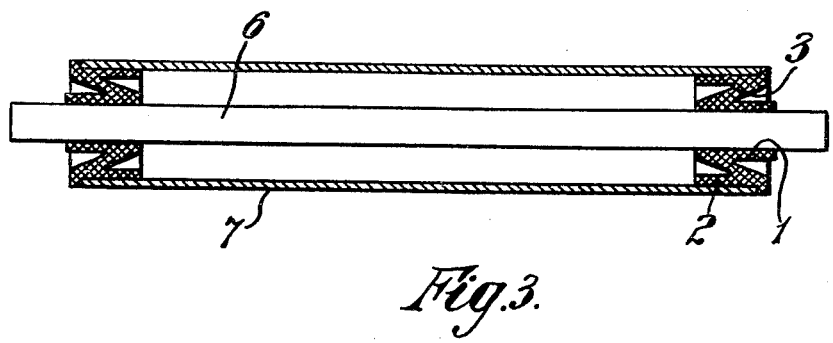

A bearing according to the invention will now be described with reference to the accompanying drawings, in which:

FIG. 1 is a plan view of a bearing,
FIG. 2 is a cross-section on the line II—II of FIG. 1, and
FIG. 3 shows in section a roller of a roller conveyor mounted on a shaft by means of two bearings according to the invention.

The bearing shown in FIGS. 1 and 2 is made from nylon and consists of an inner sleeve 1 and an outer sleeve 2 providing an annular space between them. A connecting member 3, which is arranged in the annular space, has the shape of a hollow truncated cone and connects one end 4 of the inner sleeve 1 to the opposite end 5 of the outer sleeve 2. The connecting member 3 is integral with the sleeves 1 and 2. It will be noted that the bearing can be made economically by an injection moulding process.

In use, the bore of the inner sleeve 1 carries a shaft in rotatable relationship to a second part which acts as a housing in which the outer sleeve 2 fits.

Referring to FIG. 3, two bearings according to the invention are mounted on a shaft 6 near its ends. The shaft 6 is mounted in a non-rotating manner in a support (not shown). The outer sleeves 2 carry the roller 7 of a roller conveyor. There is a running fit between the shaft 6 and the inner sleeve 1 of the bearing, and a tight fit between the roller 7 and the outer sleeve 2. If desired, roller 7 may be secured to the outer surface of sleeve 2 by adhesive or other suitable means.

Upon absorption of moisture, all the dimensions of the bearing have a tendency to enlarge. Thus the inner end outer diameter of both sleeves tend to increase. The inner sleeve 1 can expand freely, causing the fit between shaft 6 and sleeve 1 to get looser and tending to increase the outer diameter of sleeve 1. Increase in the outer diameter of sleeve 2, however, is prevented by its housing, so that the material of this sleeve is forced inwards, resulting in a decrease of the inner diameter of sleeve 2. Consequently, the wall of the truncated cone is forced to assume a position in which the semi-angle of the cone becomes more acute. This is possible due to the elasticity of the material, and results in a small relative axial displacement between sleeves 1 and 2. There is also a lengthwise expansion of the two sleeves and the connecting member 3. However, compensation is provided for relative axial movement of adjacent ends of the sleeve by having the connecting member connect opposite ends of the two sleeves.

What is claimed is:

1. A bearing of plastics material comprising two cylindrical sleeves positioned coaxially relative to each other about a common axis to form a space therebetween, a connecting member in said space to connect opposite ends of said sleeves, and said member being formed integral with said sleeves and being inclined at an angle to the axis.

2. A bearing of plastics material comprising two coaxial cylindrical sleeves positioned about a common axis to form a space therebetween, a frusto-conical connecting member to connect the sleeves, said member being integral with the sleeves, and said member being positioned within the annular space between the sleeves.

3. A bearing of plastics material comprising two coaxial cylindrical sleeves of different diameters to form a space therebetween, and a connecting member inclined at a continuous angle to connect one end of the inner sleeve with the opposite end of the outer sleeve.

4. A bearing of plastics material comprising two cylindrical sleeves positioned coaxially relative to each other about a common axis to form a space therebetween, a connecting member in said space to connect one end of the inner sleeve with the opposite end of the outer sleeve, said member being within the annular space between the sleeves, and the connecting member being integral with the sleeves and having the shape of a hollow truncated cone.

5. A bearing of plastics material having a high coefficient of moisture absorption comprising two coaxial cylindrical sleeves positioned about a common axis to form a space therebetween, and a connecting member which connects the sleeves, said member being integral with the sleeves and arranged in the annular space between the sleeves, the connecting member further being inclined at an acute angle to the axis of said sleeves.

References Cited in the file of this patent

UNITED STATES PATENTS

| Re. 16,432 | Smith | Sept. 28, 1926 |
| 1,497,305 | Sawhill | June 10, 1924 |
| 1,825,239 | Meyer | Sept. 29, 1931 |
| 2,159,545 | Bartosch | May 23, 1939 |
| 2,207,290 | Hale | July 9, 1940 |
| 2,878,074 | Cawl | Mar. 17, 1959 |